United States Patent
Ramachandran et al.

(10) Patent No.: US 8,374,174 B2
(45) Date of Patent: Feb. 12, 2013

(54) METHOD AND APPARATUS FOR OPERATION OF A COMMUNICATION DEVICE

(75) Inventors: Shyamal Ramachandran, Lake Mary, FL (US); Pertti O. Alapuranen, Delton, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1141 days.

(21) Appl. No.: 12/042,825

(22) Filed: Mar. 5, 2008

(65) Prior Publication Data
US 2009/0225696 A1 Sep. 10, 2009

(51) Int. Cl.
*H04L 12/50* (2006.01)

(52) U.S. Cl. ........ 370/359; 370/419; 370/447; 370/462; 370/463

(58) Field of Classification Search .......... 370/401, 370/445, 446, 447, 448
See application file for complete search history.

(56) References Cited

U.S. PATENT DOCUMENTS

| | | | | |
|---|---|---|---|---|
| 5,164,942 A | * | 11/1992 | Kamerman et al. | 370/334 |
| 7,110,752 B2 | | 9/2006 | Okajima | |
| 7,809,013 B2 | * | 10/2010 | Waxman | 370/464 |
| 2005/0259673 A1 | | 11/2005 | Lu et al. | |
| 2006/0165078 A1 | * | 7/2006 | Gopinath et al. | 370/389 |
| 2007/0076649 A1 | * | 4/2007 | Lin et al. | 370/328 |
| 2008/0019315 A1 | * | 1/2008 | Machida | 370/330 |
| 2009/0067448 A1 | * | 3/2009 | Stanwood et al. | 370/447 |

FOREIGN PATENT DOCUMENTS

| | | |
|---|---|---|
| KR | 10-2003-035163 A | 5/2003 |
| KR | 10-2005-0010270 A | 1/2005 |

OTHER PUBLICATIONS

PCT/US2009/035748—PCT Search Report with Written Opinion, mailed Oct. 20, 2009, 10 pages.

* cited by examiner

*Primary Examiner* — Bo Hui A Zhu

(57) ABSTRACT

A method of operation of a communication device. A first communication module is operatively coupled to a second communication module within the communication device. The second communication module is designed for carrier sensing. An instruction is communicated from the first communication module to the second communication module to begin sensing a channel on behalf of the first communication module. Next, the first communication module is informed of channel activity status by the second communication module. Thereafter, the first communication module transmits on the channel when no activity is detected on the channel.

19 Claims, 10 Drawing Sheets

METHOD AND APPARATUS FOR OPERATION OF A COMMUNICATION DEVICE

FIELD OF THE DISCLOSURE

The present disclosure relates generally to communication systems and more particularly to methods and systems to incorporate channel sensing capability in wireless communication systems.

BACKGROUND

Conventional communication devices are designed to be either contention based or non-contention based. Contention based communication devices implement a listen-before-transmit policy for using a channel for communication. Whereas, non-contention based communication devices are not designed to implement a listen-before-transmit policy for using a channel for communication and are incapable of performing channel sensing. However, certain channels mandate contention based channel access. For example, a license free band such as the 3.65 Giga Hertz (GHz) band in the United States mandates contention based channel access. Therefore, use of such channels is restricted to contention based communication devices as non-contention based communication devices are unable to perform channel sensing.

This problem has often been mitigated by modifying the protocol used by non-contention based communication devices so that they monitor the air-interface for out-of-system energy and suspend the next frame if they detect the out-of-system energy. Such devices are required to perform monitoring for each frame, in case it is required to occupy a channel for longer durations. Moreover, the control over the channel cannot be retained for longer durations in case another device starts transmitting on the channel. Further, these devices monitor the channel during a usable part of the frame. Such an approach drastically impacts bandwidth usage on a channel. Moreover, these devices need to make transitions between various modes of operation, which include monitoring mode and transmitting mode. This further impacts the bandwidth usage on the channel.

Accordingly, there is a need for method and apparatus for operation of a communication device which incorporates channel sensing capability in non-contention based communication devices and also addresses at least some of the shortcomings of past and present techniques of communication between wireless devices.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
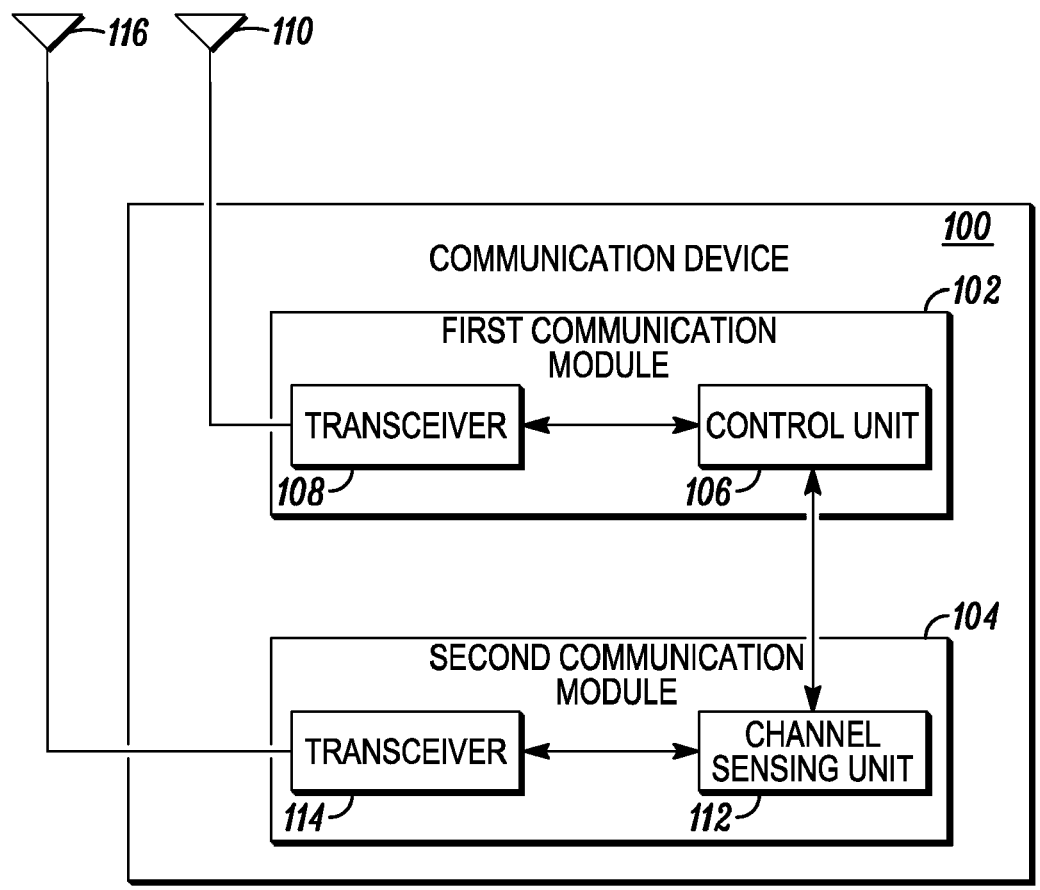
FIG. 1 is a block diagram of an example communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, a method of operation of a communication device is described hereafter. First, a first communication module is operatively coupled to a second communication module within the communication device. The second communication module is designed for carrier sensing. Then, an instruction is communicated from the first communication module to the second communication module to begin sensing a channel on behalf of the first communication module. Next, the first communication module is informed of channel activity status by the second communication module. Thereafter, the first communication module transmits on the channel when no activity is detected on the channel.

Referring now to the drawings, and in particular FIG. 1, a block diagram of a communication device in accordance with some embodiments is shown and indicated generally as 100. Communication device 100 includes a first communication module 102 and a second communication module 104. An example of communication device 100 is a Worldwide Interoperability for Microwave Access (WiMAX) base station. Second communication module 104 is operatively coupled to first communication module 102. First communication module 102 includes a control unit 106 for determining a time duration for which a channel is required to be occupied and for sending one or more instructions to second communication module 104. The one or more instructions include an instruction to start sensing a channel and an instruction to reserve a channel for the time duration. Further, first communication module 102 includes a transceiver 108 for transmitting and receiving signals using an antenna 110. In an embodiment, transceiver 108 includes a transmitting unit for transmitting signals on a channel and a receiver unit for receiving signals on the same or another channel. In accordance with some embodiments, the first communication module 102 is a WiMax communication module.

Second communication module 104 is designed for carrier sensing. In accordance with some embodiments, the second communication module 104 is a Wireless Fidelity (WiFi) communication module. Second communication module 104 includes a channel sensing unit 112 for sensing a channel and for informing first communication module 102 if any activity is detected on the channel. Further, second communication module 104 includes a transceiver 114 for transmitting and receiving signals using an antenna 116. In accordance with some embodiments, the communication device 100 includes one of antenna 110 and 116, and transceivers 108 and 114 operate using one or more of the antennas 110 and 116 for transmitting and receiving signals. In accordance with some embodiments, the transceiver 114 includes a transmitting unit for transmitting an access reservation message on the channel for reserving the channel for the time duration and a receiver unit for receiving signals on the same or another channel. Channel sensing unit 112 is operatively coupled to control unit 106. In accordance with some embodiments, the control unit 106 sends the one or more instructions to the channel sensing unit 112. Further, channel sensing unit 112 informs control unit 106 if any activity is detected on the channel.

Figure 2:
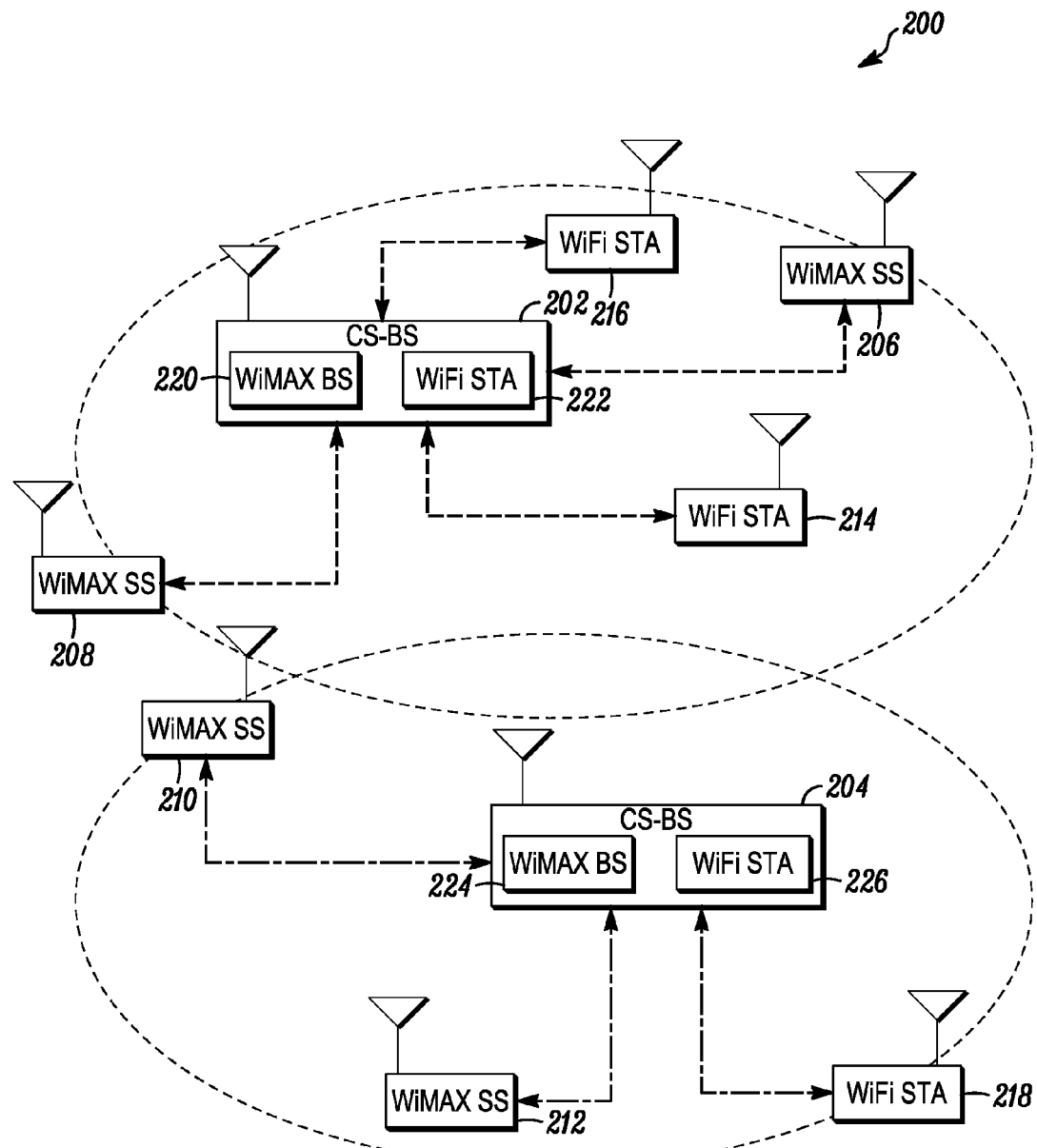
FIG. 2 is a block diagram of an example wireless communication network in accordance with some embodiments.

Turning now to FIG. 2, a schematic diagram of an example wireless communication network 200 in accordance with some embodiments is described hereinafter. Wireless communication network 200 includes a Carrier Sense—Base Station (CS-BS) 202, a CS-BS 204, a plurality of WiMax subscriber stations (WiMax SS) 206, 208, 210 and 212, and a plurality of WiFi stations (WiFi Sta) 214, 216, 218, 222 and 226. In accordance with some embodiments, each of CS-BS 202 and CS-BS 204 is the communication device 100. In accordance with some embodiments, the WiFi stations 222 and 226 may have different functionalities from the WiFi stations 214, 216 and 218. In accordance with some embodiments, the WiFi stations 222 and 226 have same functionalities as WiFi stations 214, 216 and 218. WiMax SS 206, 208, 210 and 212 may not sense a channel before transmitting. It should be readily understood by those of ordinary skill in the art that additional or fewer CS-BS, WiMax SS and WiFi Sta may be there in wireless communication network 200.

CS-BS 202 includes a WiMax BS 220 and a WiFi Sta 222. In accordance with some embodiments, WiMax BS 220 is a first communication module 102 and WiFi Sta 222 is a second communication module 104. CS-BS 202 is in communication with WiMax SS 206, WiMax SS 208, WiFi Sta 214 and WiFi Sta 216. WiFi Sta 222 is configured to sense a channel on behalf of WiMax BS 220 and to inform WiMax BS 220 when an activity is detected on the channel. Further, WiMax BS 220 may instruct WiFi Sta 222 to reserve a channel for a time duration, where the channel is currently being used by WiMax BS 220 for transmitting signals. Similarly, CS-BS 204 includes a WiMax BS 224 and a WiFi Sta 226. WiMax BS 224 is a first communication module 102 and WiFi Sta 226 is a second communication module 104. CS-BS 204 is in communication with WiMax SS 210, WiMax SS 212, and WiFi Sta 218. WiFi Sta 226 is configured to sense a channel of behalf of WiMax BS 224 and to inform WiMax BS 224 when an activity is detected on the channel. Further, WiMax BS 224 may instruct WiFi Sta 226 to reserve a channel for a time duration, where the channel is currently being used by WiMax BS 224 for transmitting signals.

Figure 3:
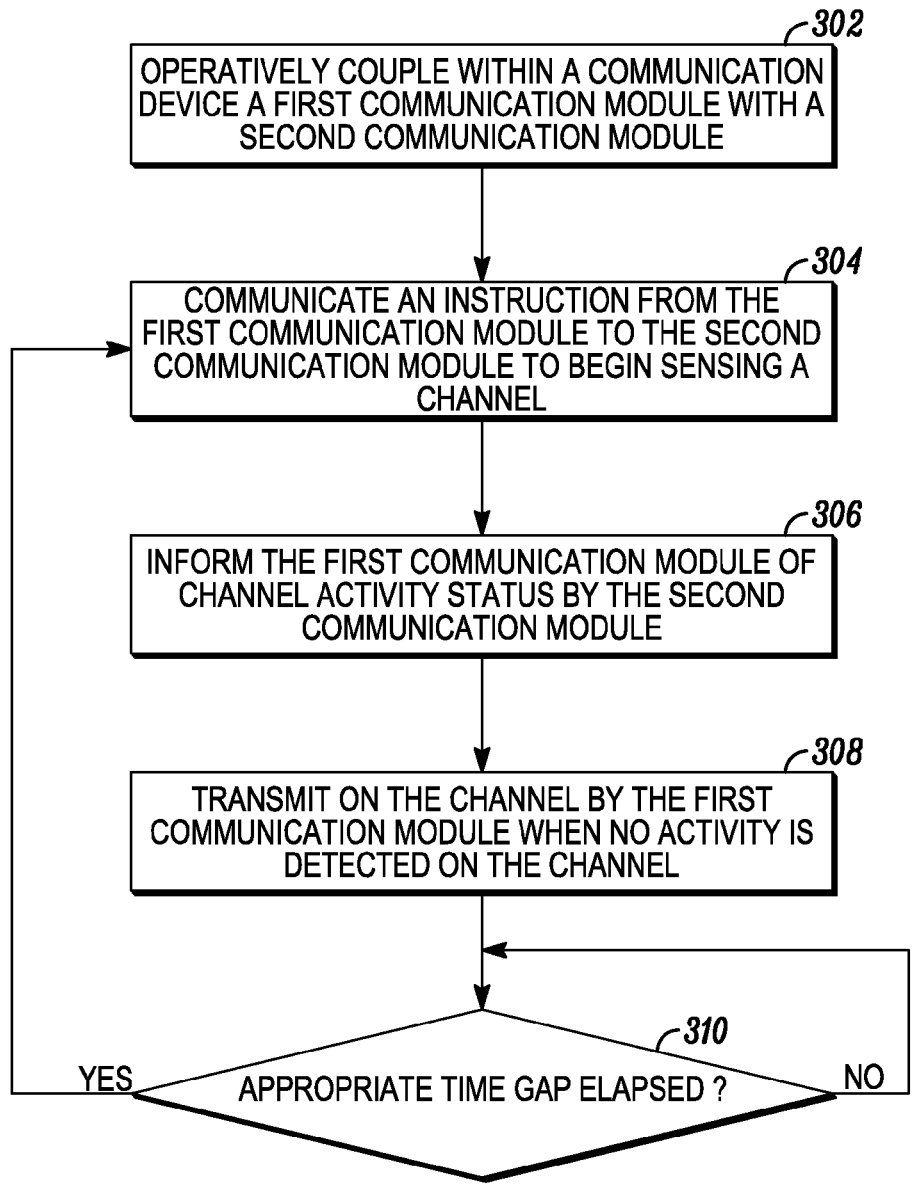
FIG. 3 is a flowchart of a method of operation of a communication device in accordance with some embodiments.

Turning now to FIG. 3, a flowchart of a method of operation of communication device 100 in accordance with some embodiments is described hereafter. At 302, first communication module 102 is operatively coupled to second communication module 104 within communication device 100. In an embodiment, this is achieved by operatively coupling channel sensing unit 112 with control unit 106. Second communication module 104 is capable of carrier sensing whereas first communication module 102 is not designed for carrier sensing. Therefore, at 304, an instruction is communicated from first communication module 102 to second communication module 104 to begin sensing a channel on behalf of first communication module 102. Second communication module 104 begins sensing the channel. At 306, second communication module 104 informs first communication module 102 of channel activity status. Thereafter, at 308, first communication module 102 transmits on the channel when no activity is detected on the channel by second communication module 104.

At 310, an appropriate time gap is allowed to pass. When the appropriate time gap passes, the control goes back to 304 and the method is repeated thereafter. In some embodiments of the invention the appropriate time gap may be a WiMax frame duration.

Figure 4:
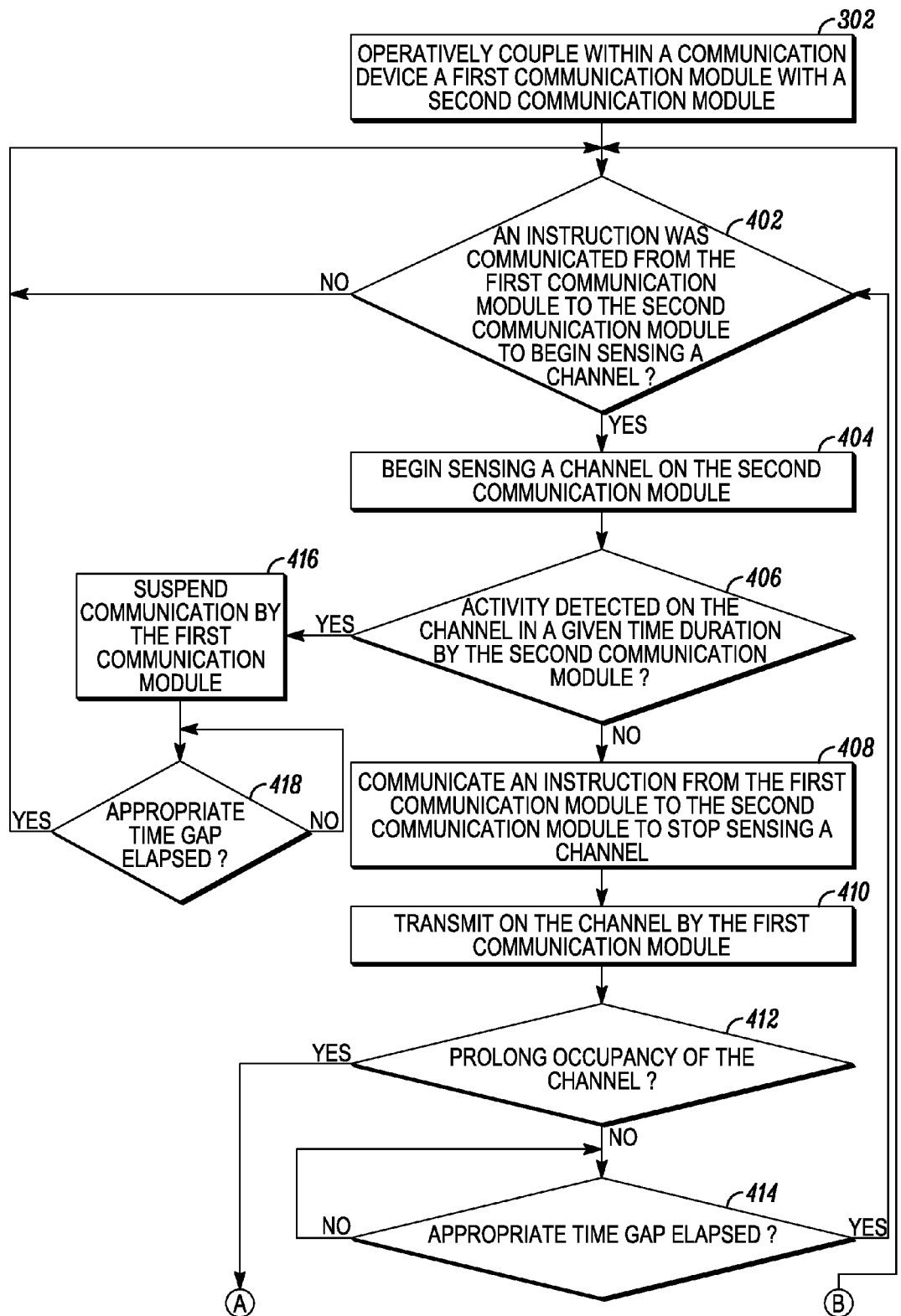
FIG. 4 is a flowchart of a method of operation of a communication device in accordance with some embodiments.

Turning now to FIG. 4, a flowchart of a method of operation of communication device 100 in accordance with some embodiments is described hereafter. At 302, first communication module 102 is operatively coupled to second communication module 104 within communication device. This has been explained in detail in conjunction with FIG. 3 above. Next, at 402, it is checked whether an instruction was communicated from first communication module 102 to second communication module 104 to begin sensing a channel. The checking is performed until the instruction is communicated. When the instruction is communicated, second communication module 104 begins sensing the channel at 404. At 406, it is checked whether an activity is detected on the channel in a given time duration by second communication module 104. When no activity is detected, first communication module 102 communicates an instruction to second communication module 104 to stop sensing the channel at 408. Thereafter, at 410, first communication module 102 transmits on the channel.

Furthermore, at 412 it is checked whether it is required to prolong occupancy of the channel. Incase, it is required to prolong occupancy of the channel the control goes to 502 of FIG. 5. This has been explained in detail in conjunction with FIG. 5 below. On the other hand, if it is not required to prolong occupancy of the channel, an appropriate time gap is allowed to pass at 414. When the appropriate time gap passes, control goes to 402 and the method is repeated thereafter.

When activity is detected by second communication module 104 at 406; first communication module 102 suspends communications on the channel. Second communication module 104 may stop sending channel once it detects activity on the channel. Thereafter, an appropriate time gap is allowed to pass at 418. When the appropriate time gap passes, control goes to 402 and the method is repeated thereafter.

Figure 5:
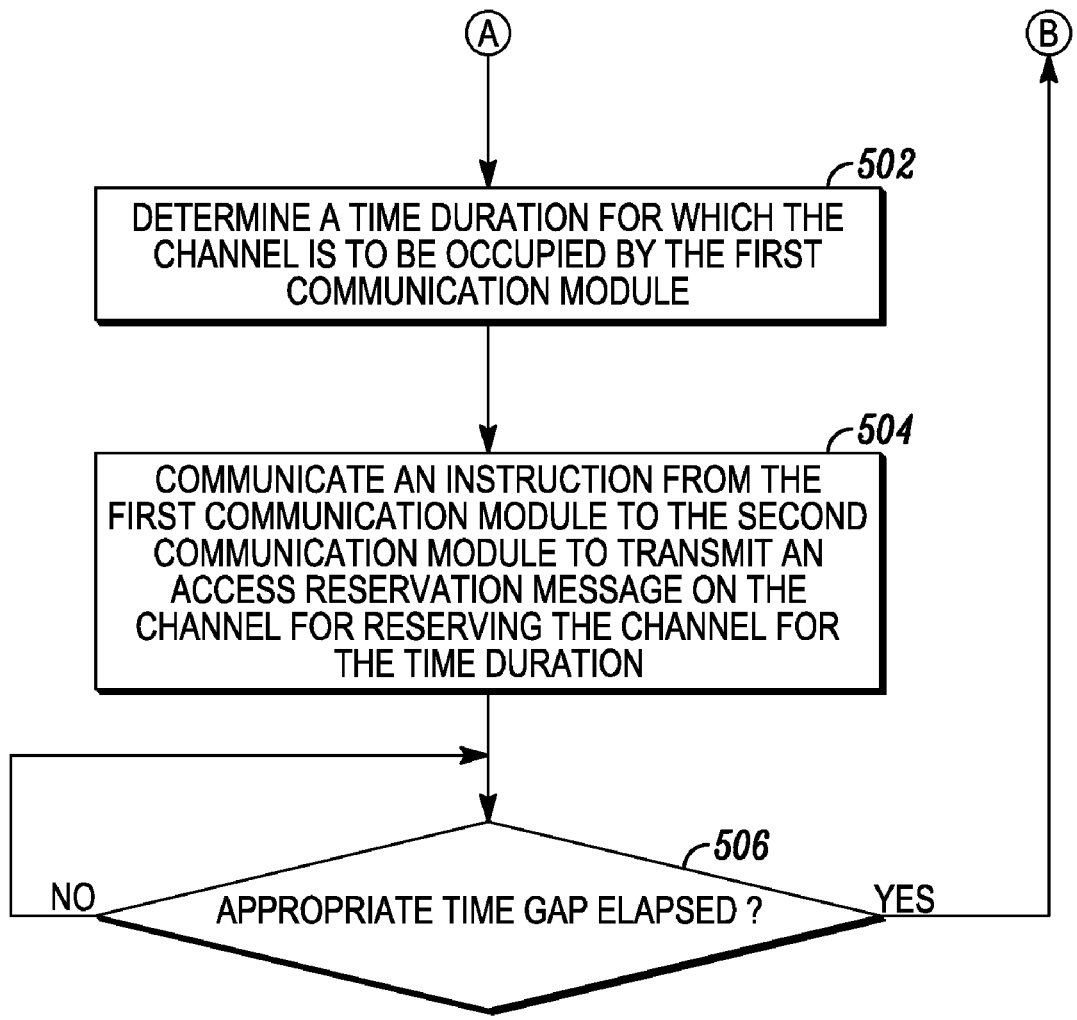
FIG. 5 is a flowchart of a method for prolonging occupation of a channel by a communication module in accordance with some embodiments.

Turning now to FIG. 5, a flowchart of a method for prolonging occupation of a channel by first communication module 102 in accordance with some embodiments is described hereafter. At 502, first communication module 102 determines a time duration for which the channel is to be occupied. The time duration may end at start of a next communication frame of first communication module 102. In an embodiment, the time duration may end at start of an identified future communication frame of first communication module 102. This is explained in detail in conjunction with FIG. 10. The time duration may be determined based on when one or more other communication devices, in communication with first communication module 102, require the channel. In an exemplary embodiment, CS-BS 202 is communication device 100, WiMAX BS 220 is first communication module 102 and WiFi 22 is second communication module 104. Further, WiMAX SS 206 and 208 are the one or more other communication devices.

Next, first communication 102 communicates an instruction to second communication module 104 to transmit an access reservation message on the channel for reserving the channel for the time duration at 504. This has been explained in detail in conjunction with FIG. 7 and FIG. 8. The time duration may be encoded in the access reservation message. Thereafter, an appropriate time gap is allowed to pass at 506. When the appropriate time gap elapses, control goes to 402 and the process is repeated thereafter as described in conjunction with FIG. 4.

Figure 6:
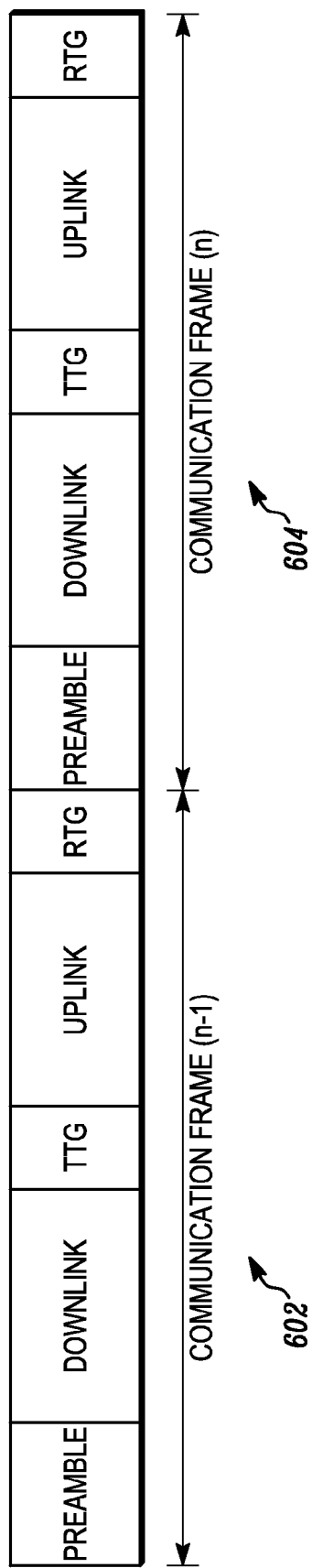
FIG. 6 is a block diagram illustrating communication frames in accordance with some embodiments.

Turning now to FIG. 6, a block diagram illustrating a communication frame 602 and a communication frame 604 of first communication module 102 in accordance with some embodiments is described hereafter. In accordance with some embodiments, each of communication frame 602 and communication frame 604 include a pre-amble, a downlink sub-frame, a Transmit/receive Transition Gap (TTG), an uplink sub-frame and a Receive/transmit Transition Gap (RTG).

Figure 7:
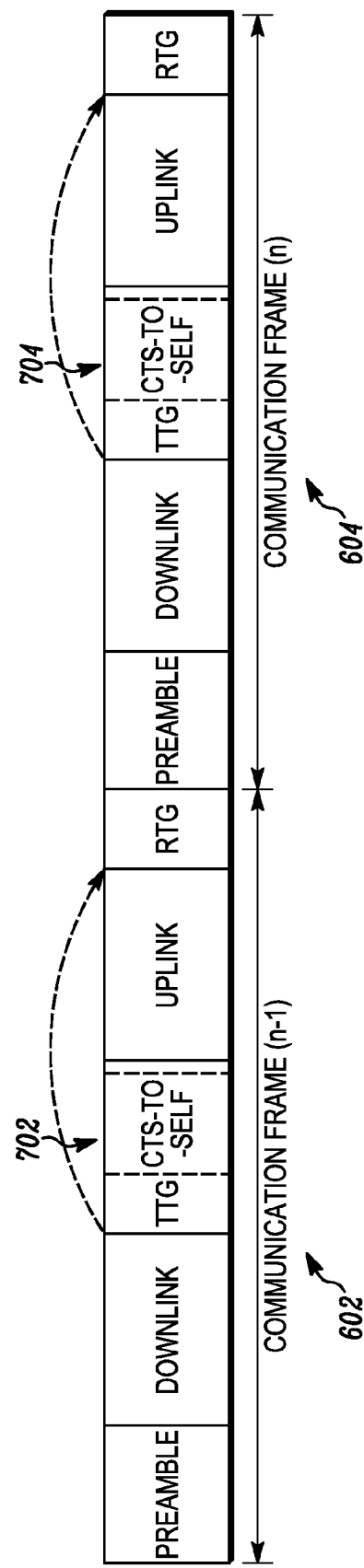
FIG. 7 is a block diagram illustrating communication frames in accordance with some embodiments.

Turning now to FIG. 7, a block diagram illustrating communication frame 602 and communication frame 604 of first communication module 102 in accordance with some embodiments is described hereafter. In accordance with some embodiments, at 504, second communication module 104 transmits the access reservation message during TTG 702 in communication frame 602 and TTG 704 in communication frame 604. In accordance with some embodiments, the access reservation message is a clear-to-send (CTS)-to-self message as shown in FIG. 7.

Figure 8:
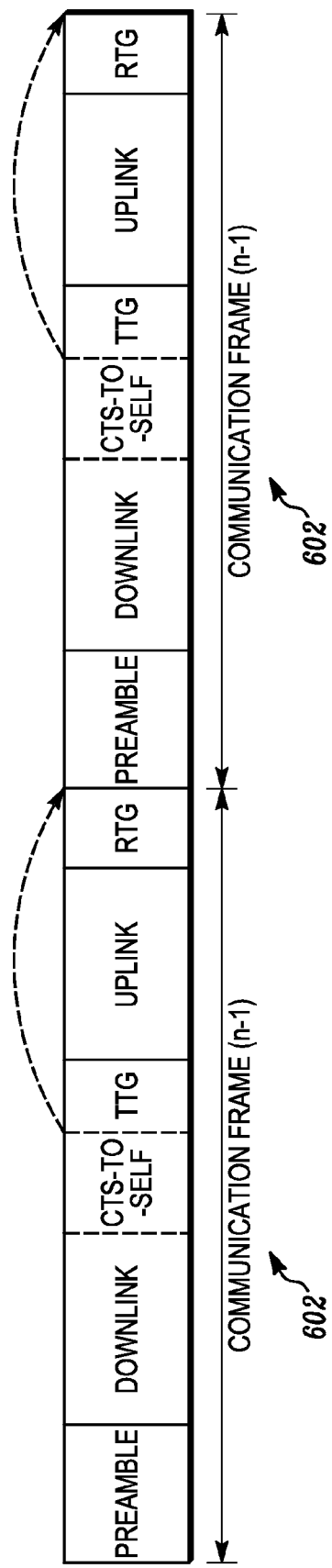
FIG. 8 is a block diagram illustrating communication frames in accordance with some embodiments.

Turning now to FIG. 8, a block diagram illustrating communication frame 602 and communication frame 604 of first communication module 102 in accordance with some embodiments is described hereafter. In accordance with some embodiments, at 504, first communication module 102 refrains from communication on a portion of a downlink sub-frame of the first communication module and second communication module 104 transmits the access reservation message during the portion of a downlink sub-frame as shown in FIG. 8. Access reservation message may be a clear-to-send (CTS)-to-self message. In accordance with some embodiments, second communication module 104 transmits the access reservation message during downlink time of first communication module 102.

Figure 9:
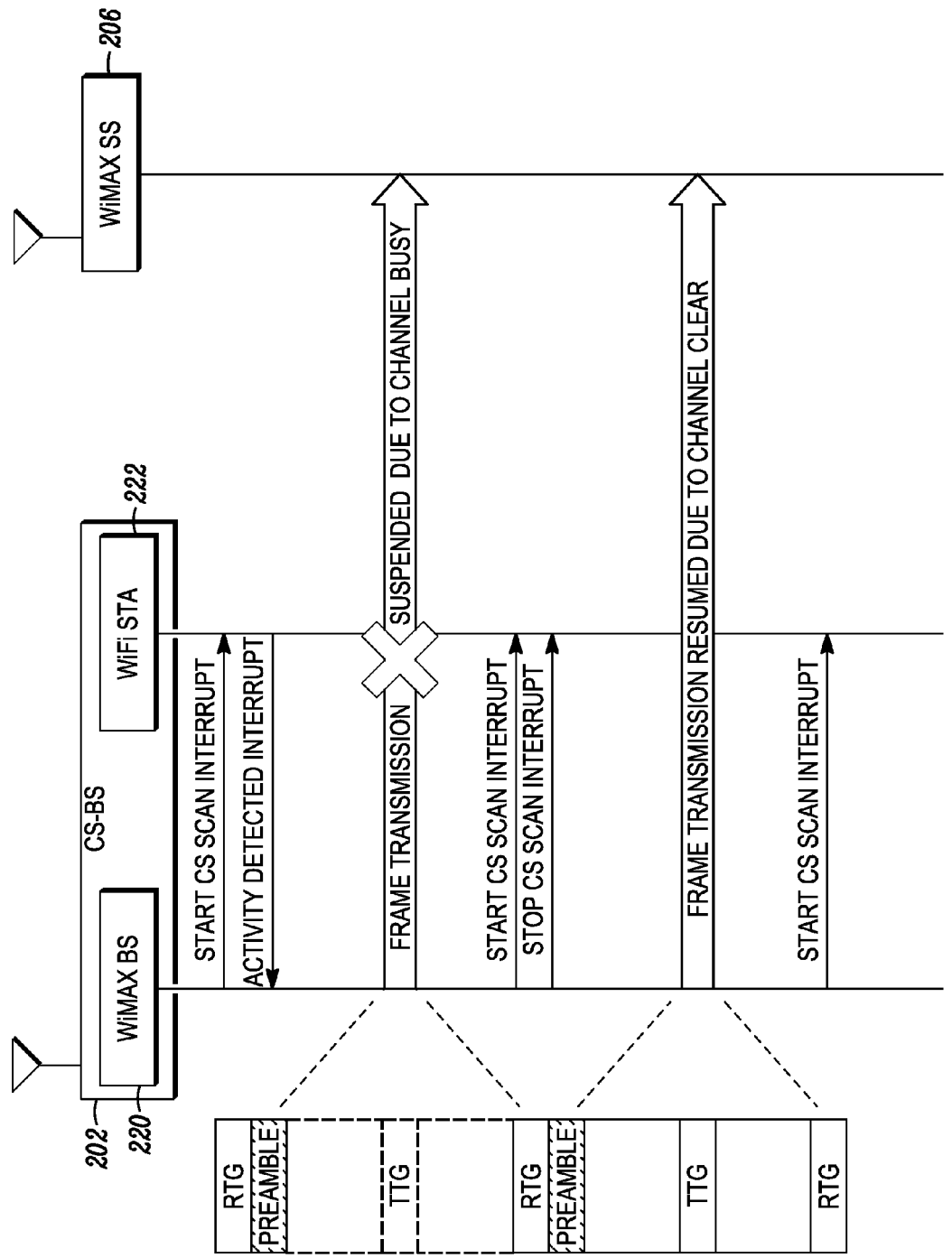
FIG. 9 is a timing diagram which illustrates an operation of a communication device in accordance with some embodiments.

Turning now to FIG. 9, a timing diagram which explains operation of CS-BS 202 in accordance with some embodiments is described hereafter. CS-BS 202 includes a WiMAX BS 220 and a WiFi Sta 222. In accordance with some embodiments, WiMAX BS 220 is communicating over a channel using communication frames as shown in FIG. 6. At start of RTG of communication frame, WiMAX BS 220 instructs WiFi Sta 222, by sending a start CS scan interrupt, to start sensing the channel. WiFi Sta 222 starts sensing a channel. Then, WiFi Sta 222 detects an activity on the channel and informs WiMAX BS 220 by sending an activity detected interrupt to WiMAX BS 220. Thereby, WiMAX BS 220 suspends frame transmission for next communication frame. WiMAX BS allows an appropriate time gap to pass before sending start CS scan interrupt to the WiFi Sta 222. WiMAX BS waits till RTG sub-frame of next communication frame arrives. The time duration that WiMAX BS waits for corresponds to the appropriate time gap of 310 in FIG. 3, the appropriate time gap of 414 and 418 in FIG. 4.

At start of next RTG, WiMAX BS 220 sends a start CS scan interrupt to WiFi Sta 222 to instruct WiFi Sta 222 to start sensing the channel. WiFi Sta 222 starts sensing the channel. Then, at end of this RTG, WiMAX BS 220 sends a stop CS scan interrupt to WiFi Sta 222 to instruct WiFi Sta 222 to stop sensing the channel. WiFi Sta 222 does not detect any activity on the channel. Therefore, WiMAX BS 220 transmits signals on the channel during the next communication frame.

Figure 10:
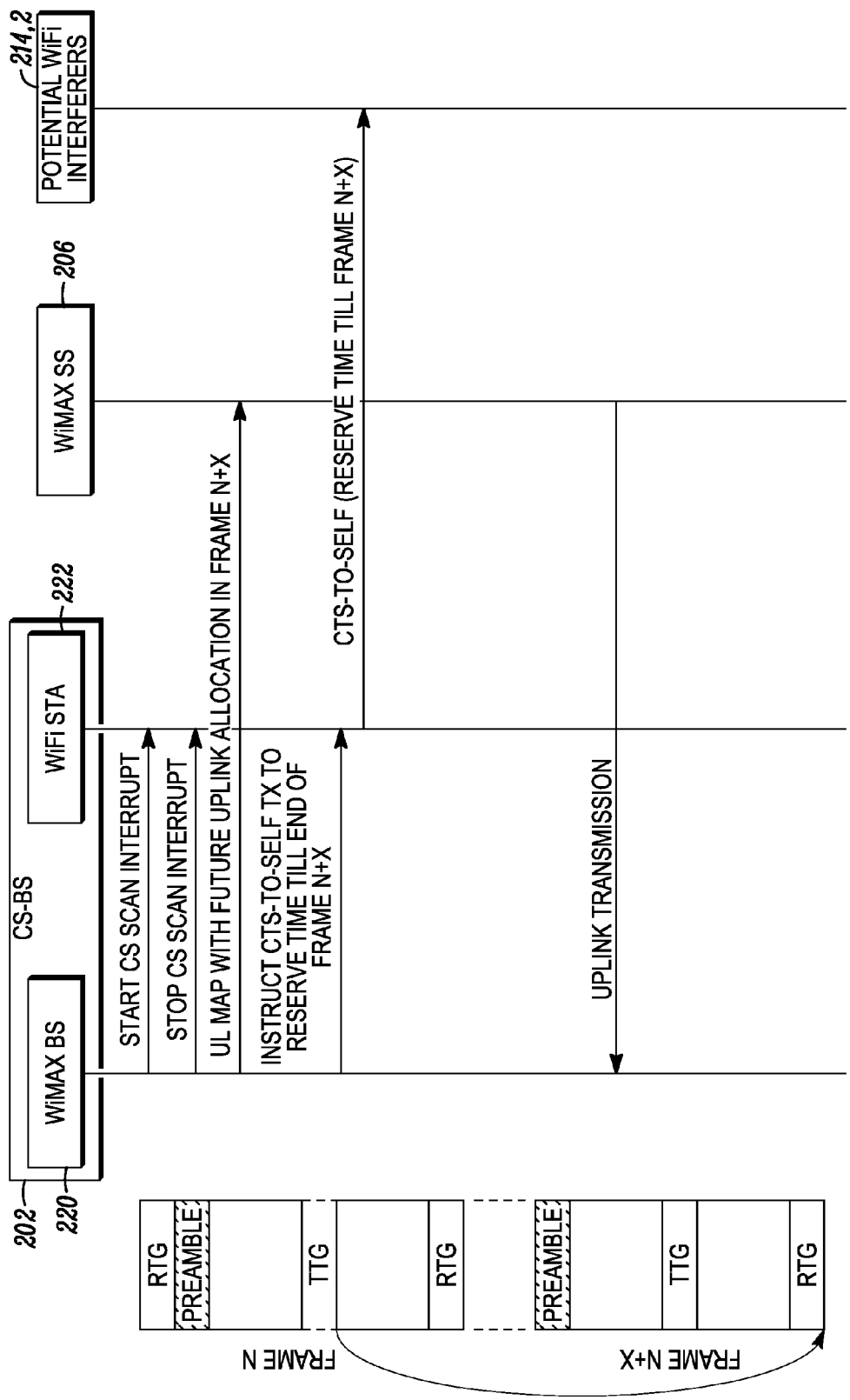
FIG. 10 is a timing diagram showing signals for prolonging occupation of a channel by a communication device in accordance with some embodiments.

Turning now to FIG. 10, a timing diagram showing signals for prolonging occupation of a channel until a future frame by CS-BS 202 in accordance with some embodiments is described hereafter. At the start of RTG of a communication frame, WiMAX BS 220 sends a start CS scan interrupt to WiFi Sta 222 to instruct WiFi Sta 222 to start sensing the channel. Then, at end of this RTG, WiMAX BS 220 sends a stop CS scan interrupt to WiFi Sta 222 to instruct WiFi Sta 222 to stop sensing the channel. WiFi Sta 222 does not detect any activity on the channel. Therefore, WiMAX BS 220 transmits a UL-MAP message to WiMAX SS 206 on the channel during the next communication frame. The UL-MAP message includes information regarding allocating a future frame Frame N+X to WiMAX SS 206. Thereafter, WiMAX BS 220 instructs WiFi Sta 222 to transmit a CTS-to-self signal to reserve channel till end of Frame N+X. Thereafter, WiFi Sta 222 transmits the CTS-to-self signal on the channel. WiFi Sta 222 may transmit the CTS-to-self signal during TTG of Frame N, as shown in FIG. 7. In accordance with some embodiments, WiMAX BS 220 may refrain from communication on a portion of downlink sub-frame of Frame N and WiFi Sta 222 may transmit CTS-to-self signal during the portion of downlink sub-frame of Frame N, as shown in FIG. 8.

Potential Wi-Fi interferers, which include WiFi Sta 214 and 216, receive the CTS-to-self signal and thereby refrain from transmitting on the channel till the end of Frame N+X. Finally, during Frame N+X of WiMAX BS 220, WiMAX SS 206 transmits signals on the channel.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of operation of a communication device, the method comprising:
   operatively coupling within the communication device a first communication module with a second communication module, wherein the second communication module is designed for carrier sensing;
   communicating a first instruction from the first communication module to the second communication module to begin sensing a channel on behalf of the first communication module;
   informing the first communication module of channel activity status by the second communication module; and
   transmitting on the channel by the first communication module when no activity is detected on the channel.

2. The method of claim 1, further comprising:
   suspending communication by the first communication module on the channel when channel activity is detected on the channel by the second communication module.

3. The method of claim 1, wherein the first communication module is not designed for carrier sensing.

4. The method of claim 1, wherein the communication device is a Worldwide Interoperability for Microwave Access (WiMAX) base station, and further wherein the first communication module is a WiMax communication module and the second communication module is a Wireless Fidelity (WiFi) communication module.

5. The method of claim 1 further comprising:
   communicating a second instruction from the first communication module to the second communication module to stop sensing the channel.

6. The method of claim 1, wherein transmitting on the channel comprises transmitting on the channel by the first communication module when no activity is detected on the channel for a given time duration.

7. The method of claim 6, wherein the given time duration is within a receive/transmit transition gap (RTG) in a communication frame of the first communication module.

8. The method of claim 1 further comprising after the transmitting step:
   prolonging occupancy of the channel by the first communication module by:
      determining a time duration for which the channel is to be occupied by the first communication module; and
      communicating a second instruction from the first communication module to the second communication module to transmit an access reservation message on the channel for reserving the channel for the time duration.

9. The method of claim 8, wherein determining a time duration comprises determining when one or more other communication devices in which the first communication module communicates with require the channel.

10. The method of claim 8, further comprising:
    transmitting the access reservation message by the second communication module during a transmit/receive transition gap (TTG) in a communication frame of the first communication module.

11. The method of claim 8, further comprising:
    refraining from communication on a portion of a downlink frame of the first communication module by the first communication module; and
    transmitting the access reservation message by the second communication module during the portion of the downlink frame.

12. The method of claim 8, further comprising:
    transmitting the access reservation message by the second communication module during a downlink time of the first communication module.

13. The method of claim 8, wherein the time duration ends at a start of a next communication frame.

14. The method of claim 8, wherein the time duration ends at a start of an identified future communication frame.

15. The method of claim 8, wherein the time duration is encoded into the access reservation message.

16. The method of claim 8, wherein the access reservation message is a clear-to-send (CTS)-to-self message.

17. A communication device comprising:
    a first communication module comprising:
       a control unit configured to:
          determine a time duration for which a channel is required to be occupied; and
          send one or more instructions to the second communication module, wherein the one or more instructions comprise at least one of a start sensing a channel and a reserve a channel for the time duration; and
       a transmitting unit configured to transmit on a channel; and
    a second communication module operatively coupled to the first transceiver, the second communication module comprising:
       a channel sensing unit configured to:
          sense a channel; and
          inform the first communication module if any activity is detected on the channel; and
       a transmitting unit configured to transmit an access reservation message on the channel for reserving the channel for the time duration.

18. The communication device of claim 17, wherein the first communication module is a Worldwide Interoperability for Microwave Access (WiMAX) communication module.

19. The communication device of claim 18, wherein the second communication module is a Wireless Fidelity (WiFi) communication module.

* * * * *